United States Patent
Andringa (10) Patent No.: US 11,806,739 B2
(45) Date of Patent: Nov. 7, 2023

(54) HOSE ASSEMBLY

(71) Applicant: Oshkosh Corporation, Oshkosh, WI (US)

(72) Inventor: Jeremy Andringa, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 1 day.

(21) Appl. No.: 17/514,412

(22) Filed: Oct. 29, 2021

(65) Prior Publication Data

US 2022/0134372 A1    May 5, 2022

Related U.S. Application Data (60) Provisional application No. 63/107,743, filed on Oct. 30, 2020.

(51) Int. Cl.

| | |
|---|---|
| *B05B 15/55* | (2018.01) |
| *B05B 15/65* | (2018.01) |
| *B08B 9/032* | (2006.01) |
| *F16L 11/20* | (2006.01) |
| *B05B 15/531* | (2018.01) |

(52) U.S. Cl.
CPC ............ *B05B 15/55* (2018.02); *B05B 15/531* (2018.02); *B05B 15/65* (2018.02); *B08B 9/0325* (2013.01); *B08B 9/0328* (2013.01); *F16L 11/20* (2013.01); *B08B 2209/032* (2013.01)

(58) Field of Classification Search
CPC ....... B05B 15/55; B05B 15/65; B05B 15/531; B08B 9/0325; B08B 9/0328; B08B 2209/032

USPC ..... 239/104, 106, 110, 112, 119, 413, 416.4, 239/416.5, 423, 424, 525, 526; 137/209, 137/240

See application file for complete search history.

(56) References Cited

U.S. PATENT DOCUMENTS

| | | |
|---|---|---|
| 3,845,779 A | 11/1974 | Greene, Jr. |
| 4,083,399 A | 4/1978 | Babish et al. |
| 4,246,926 A | 1/1981 | Morello |
| 4,746,063 A * | 5/1988 | Roberts .............. B05B 15/55 |
| | | 239/119 |
| 4,909,270 A | 3/1990 | Enterante et al. |
| 5,035,271 A | 7/1991 | Carmack et al. |
| 5,433,246 A | 7/1995 | Horton |
| 6,202,700 B1 | 3/2001 | Bevilacqua |
| 6,941,946 B2 | 9/2005 | Baker |
| 7,198,057 B2 * | 4/2007 | Zhurin .................. E03B 7/12 |
| | | 137/240 |

(Continued)

*Primary Examiner* — Steven J Ganey
(74) *Attorney, Agent, or Firm* — Foley & Lardner LLP (57) ABSTRACT

A hose assembly includes a first conduit, a second conduit, a nozzle assembly, and a valve assembly. The first conduit defines a first fluid path through the hose assembly. The second conduit is received within and extends partially through the first conduit. The second conduit defines a second fluid path through the hose assembly. The nozzle assembly is coupled to a first end of the first conduit. The valve assembly is fluidly coupled to the first conduit and the second conduit. The valve assembly is fluid coupled to a second end of the first conduit opposite the first end. The valve assembly is adjustable between a first position and a second position. In the first position, the valve assembly provides water into the first conduit. In the second position, the valve assembly provides pressurized air into the second conduit.

20 Claims, 5 Drawing Sheets

(56) References Cited

U.S. PATENT DOCUMENTS

| | | |
|---|---|---|
| 7,337,800 B2 | 3/2008 | Palm et al. |
| 7,824,096 B2 | 11/2010 | Lindblom et al. |
| 9,945,112 B2 | 4/2018 | Birchmeier |
| 2001/0032892 A1 | 10/2001 | Brooks et al. |
| 2004/0089733 A1* | 5/2004 | Nissinen ................ B05B 15/55 239/106 |
| 2007/0221272 A1 | 9/2007 | Apsley |

* cited by examiner

HOSE ASSEMBLY

CROSS-REFERENCE TO RELATED APPLICATION

This application claims priority to U.S. Provisional Patent Application No. 63/107,743, filed Oct. 30, 3020, the content of which is hereby incorporated by reference in its entirety.

BACKGROUND

Hoses are commonly used to clean out receptacles on refuse vehicles, concrete mixers, dump trucks, and other vehicles. The hose is connected to a pressurized water source and configured to transport water from the pressurized water source into the receptacle. The hose can then dispense water to wash away debris and other unwanted contaminants present within the receptacle. In some situations, water will remain in the hose after use. When a vehicle is used in a colder weather location, the water remaining within the hose may freeze, which can damage the hose.

SUMMARY

One exemplary embodiment relates to a hose assembly. The hose assembly includes a first conduit, a second conduit, a nozzle assembly, and a valve assembly. The first conduit defines a first fluid path through the hose assembly. The second conduit is received within and extends partially through the first conduit. The second conduit defines a second fluid path through the hose assembly. The nozzle assembly is coupled to a first end of the first conduit. The valve assembly is fluidly coupled to the first conduit and the second conduit. The valve assembly is fluid coupled to a second end of the first conduit opposite the first end. The valve assembly is adjustable between a first position and a second position. In the first position, the valve assembly provides water into the first conduit. In the second position, the valve assembly provides pressurized air into the second conduit.

Another exemplary embodiment relates to a hose assembly. The hose assembly includes a first hose, a second hose, a nozzle assembly, and a valve assembly. The first hose defines a first fluid path. The second hose is received within the first hose and defines a second fluid path surrounded by the first fluid path. The nozzle assembly is coupled to the first hose and the second hose. The valve assembly is fluidly coupled to the first hose and the second hose and is configured to selectively provide a first fluid into the first hose and a second fluid into the second hose. The valve assembly further includes a drain valve that is movable between an open position and a closed position to drain each of the first hose and the second hose simultaneously.

Another exemplary embodiment relates to a method of purging a hose assembly. The method includes providing water from a water source through a first hose to a nozzle assembly coupled to the first hose. The method further includes closing the nozzle assembly and fluidly decoupling the water source from the first hose (e.g., by closing a water valve). The method also includes opening a drain valve independent of the water source and then providing air from a pressurized air source into and through a second hose received within the first hose. The air is directed through the second hose, into the nozzle assembly, and then rearward into the first hose to push water within the first hose outward, away from the nozzle assembly and toward the drain valve.

The concept described herein is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems, apparatuses, and methods for removing and purging water from a hose after use. The hose assemblies described herein are adapted for use in cold weather applications (e.g., during winter) to wash out debris and leftover material from a receptacle on a vehicle (e.g., a cement mixer, a refuse vehicle, a dump truck, etc.) The hose assembly includes an air hose that is received within and extends through a water hose. The water hose is selectively fluidly coupled (e.g., using a valve) to a pressurized water source that is configured to supply water through the water hose toward a nozzle assembly at an end of the water hose. The nozzle assembly can be moved between a closed position where flow is restricted from flowing out of the water hose and an open position allowing flow through the nozzle assembly and out of the hose assembly. The air hose is selectively fluidly coupled (e.g., using a valve) to a pressurized air source that is configured to supply air through the air hose toward the nozzle assembly.

The hose assembly includes a drain valve that can be opened to purge the hose assembly of liquid. After the water hose has been used (e.g., to spray out a cement drum), water remains within the water hose after the water hose is disconnected from the pressurized water source (e.g., by closing a water valve). To remove the water from the water hose and reduce potential freezing within the water hose, the drain valve is opened. With the drain valve opened, an air valve can then be opened so that pressurized air is supplied from the pressurized air source into the air hose. The air travels within the air hose to the nozzle assembly, which is closed for the purging process. Because the nozzle assembly is closed, the pressurized air cannot escape outward from the hose assembly, and is redirected into the water hose. The pressurized air then pushes liquid backward through the hose assembly toward and through the drain valve. Once the water within the water hose has been pushed outward through the drain valve and out of the hose assembly through the drain, the air valve and drain valves can be closed. The hose assembly can then be stored, free of liquid, for future use.

Figure 1:
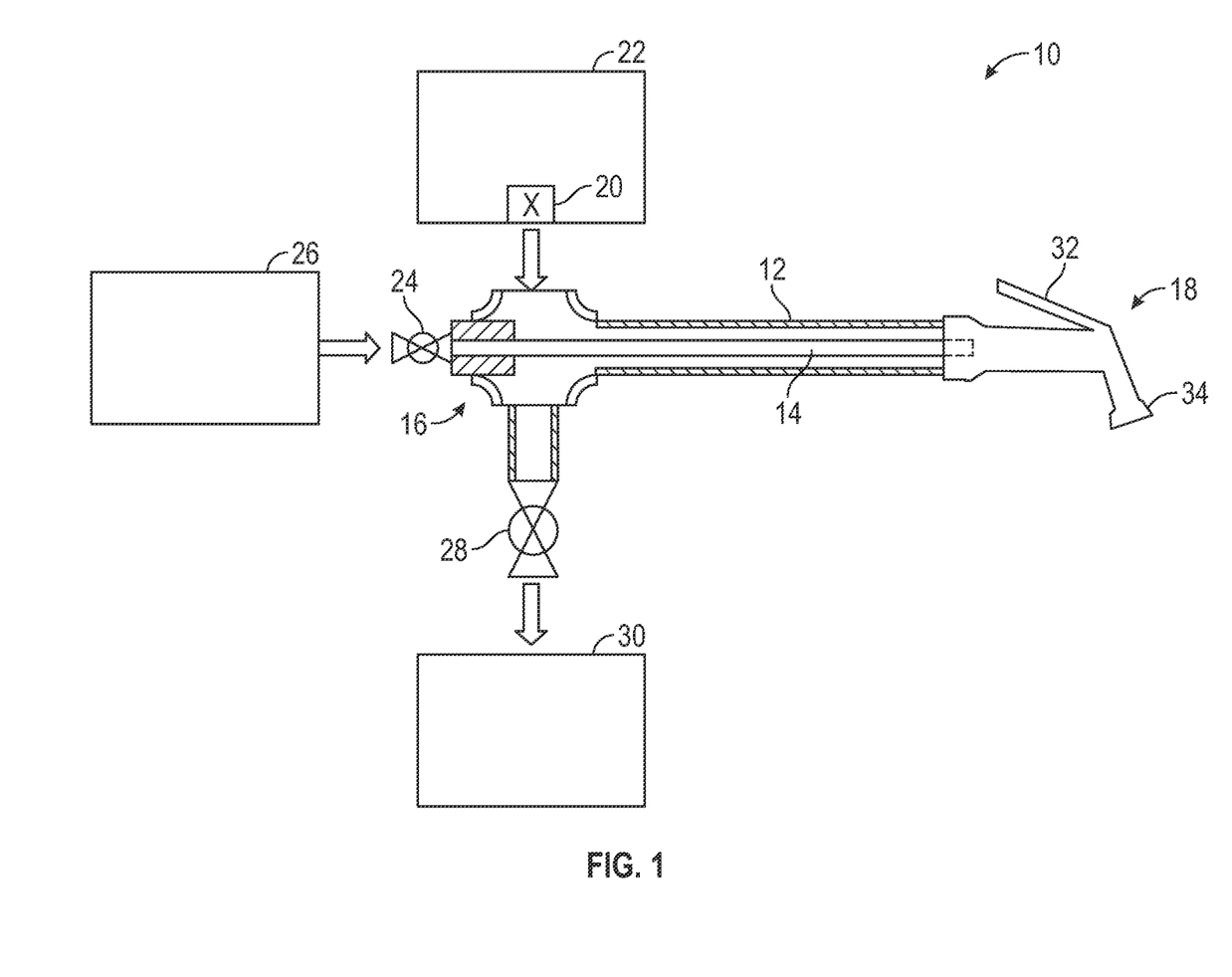
FIG. 1 is a hose assembly, according to an exemplary embodiment.

Referring now to FIG. 1, a hose assembly 10 is shown. The hose assembly 10 includes a first conduit, shown as water hose 12, and a second conduit, shown as air hose 14. The water hose 12 and the air hose 14 are each coupled to and extend away from a valve assembly 16 at a first end. The air hose 14 is received within and extends at least partially through the water hose 12. A nozzle assembly 18 is coupled to a second end of the water hose 12, opposite the first end. The nozzle assembly 18 directs fluid from each of the water hose 12 and the air hose 14 within the hose assembly 10.

The water hose 12 and the air hose 14 define different fluid flow paths through the hose assembly 10. For example, the water hose 12 can define a first fluid flow path extending between the valve assembly 16 and the nozzle assembly 18. The air hose 14 can define a second fluid flow path extending between the valve assembly 16 and the nozzle assembly 18. In some examples, the second fluid flow path is approximately parallel to the first fluid flow path. The air hose 14 can also be received within and positioned concentrically within the water hose 12, so that the second fluid flow path through the air hose 14 is surrounded by the first fluid flow path through the water hose 12. As explained below, the second fluid flow path can extend through each of the air hose 14 and the water hose 12.

The valve assembly 16 includes different valves to selectively couple the hose assembly 10 to different fluid sources to perform washing and purging functions. In some examples, the valve assembly 16 includes a water valve 20. The water valve 20 selectively creates fluid communication between a pressurized water source 22 (e.g., a water tank, a water pressure vessel, a water pump) and the water hose 12. When the water valve is opened, water is supplied from the pressurized water source 22, through the water valve 20, and into the water hose 12 toward the nozzle assembly 18. When the nozzle assembly 18 is opened, water is dispensed outward from the hose assembly 10, where it can be used to clean or wash out a receptacle on a vehicle, for example. The water valve 20 can be a variety of different valve types, including ball valves, butterfly valves, gate valves, globe valves, or solenoid valves, for example.

The valve assembly 16 can also include an air valve 24. The air valve 24 selectively creates fluid communication between a pressurized air source 26 (e.g., an air compressor, a pressure vessel, etc.) and the air hose 14 that extends within the water hose 12. When the air valve 24 is opened, air is supplied from the pressurized air source 26, through the air valve 20, and into the air hose 14 toward the nozzle assembly 18. When the nozzle assembly 18 is opened, air can be dispensed outward from the hose assembly 10, where it can be used to clean or wash out a receptacle on a vehicle, for example. When the nozzle assembly 18 is closed, the air is redirected from the air hose and rearward through the water hose 12, toward the valve assembly 16. Like the water valve 20, the air valve 24 can be a variety of different valve types, including ball valves, butterfly valves, gate valves, globe valves, or solenoid valves, for example.

The valve assembly 16 further includes a drain valve 28. The drain valve 28 is positioned between the hose assembly 10 and a drain 30 and can be used to remove liquid and other fluid from both hoses 12, 14 within the hose assembly 10 simultaneously. In some examples, the drain 30 is open to an external environment that is independent of the pressurized water source 22. Liquid and other fluids from the hose assembly 10 can be removed through the drain 30 and from the system entirely. Draining liquid and other fluid outward from the hose assembly 10 avoids pressure losses within the pressurized water source 22 that might otherwise occur if liquid was drained backward through the water valve 20 and into the pressurized water source 22. The drain valve 28 can also be a variety of different valve types, including ball valves, butterfly valves, gate valves, globe valves, or solenoid valves, for example. In some examples, the drain valve 28 and drain 30 open downwardly, so that fluid flow through the drain valve 28 and the drain 30 is aided by gravity.

Figure 2:
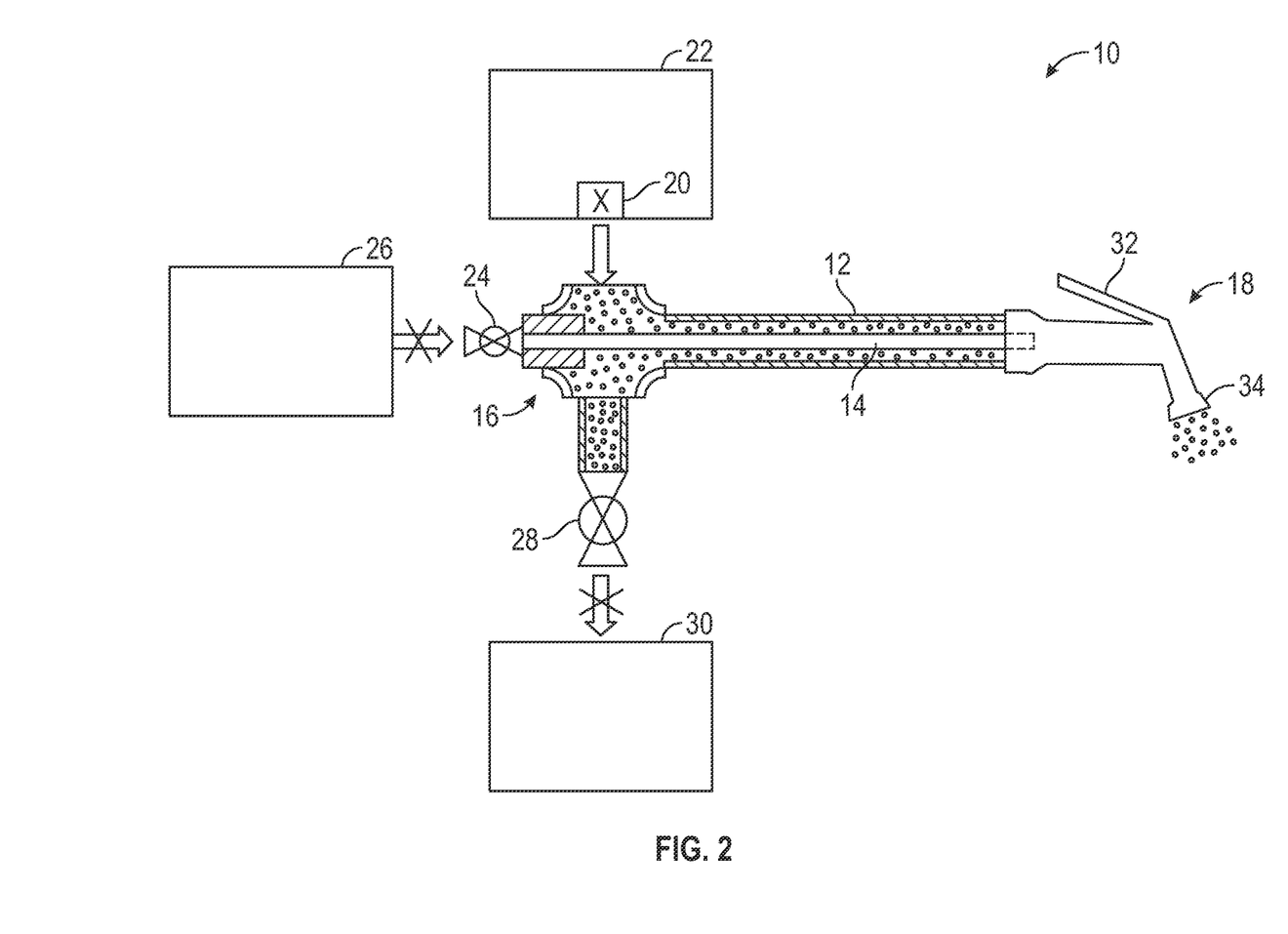
FIG. 2 is the hose assembly of FIG. 1, shown with a valve assembly of the hose assembly in a first, "dispensing" position.
Figure 3:
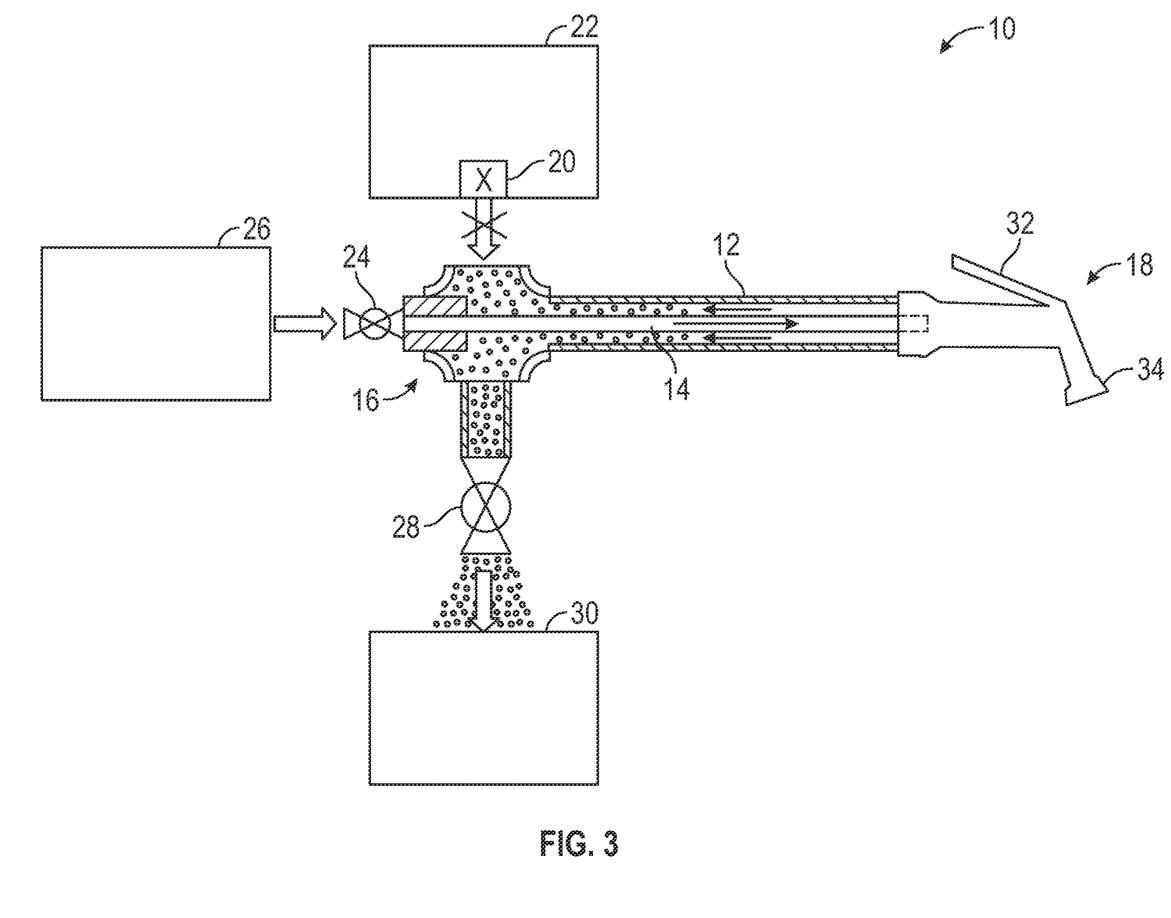
FIG. 3 is the hose assembly of FIG. 1, shown with the valve assembly of the hose assembly in a second, "purging" position.

The operation of the hose assembly 10 is shown with additional reference to FIGS. 2-3. FIG. 2 depicts the hose assembly 10 in a first or "dispensing" position. In the dispensing position, the water valve 20 is opened, so that fluid communication is established between the pressurized water source 22 and the water hose 12. The air valve 24 and the drain valve 28 are both closed. Water enters through the water valve 20 and travels along the first fluid flow path, toward the nozzle assembly 18. When the nozzle assembly 18 is opened (e.g., by actuating a trigger 32), water travels from the water hose 12 into and through the nozzle assembly 18, where it is dispensed. The nozzle assembly 18 can include a variable nozzle head 34 that is arranged so that water is dispensed outward from the water hose 12 in a variety of different spray patterns and at different velocities or pressures. When the nozzle assembly 18 is closed, water remains within the water hose 12, but is restricted from leaving the hose assembly 10.

Once the dispensing process has been completed and the hose assembly 10 is no longer needed for the receptacle washout process, the hose assembly 10 can be transitioned to a second, or "purging" position shown in FIG. 3. To transition to the purging position, the water valve 20 is closed so that water is blocked from traveling between the pressurized water source 22 and the water hose 12. The drain valve 28 can then be opened so that water within the water hose 12 will begin to drain rearward through water hose 12 and out of the drain 30. The air valve 24 is also opened. Accordingly, pressurized air from the pressurized air source 26 is supplied into the air hose 14. The pressurized air within the air hose 14 travels toward the nozzle assembly 18 at the end of the hose assembly 10. If the nozzle assembly 18 is closed (e.g., the trigger 32 is not actuated), pressurized air within the air hose 14 is redirected directed by the nozzle assembly 18 backward, into the water hose 12. The pressurized air then pushes liquid remaining within the water hose 12 backward toward the valve assembly 16 and the drain 30, until the air exits through the drain 30. As indicated by the arrows shown in FIG. 3, the second fluid flow path (e.g., the flow path taken by the pressurized air) extends from the valve assembly 16, into the air hose 14, to the nozzle assembly 18, and rearward through the water hose 12 to the drain 30. Accordingly, during the purging operation, pressurized air can be traveling through the hose assembly 10 in opposite and parallel directions.

Using the purging process depicted in FIG. 3, the water hose 12 and hose assembly 10, generally, can be flushed of liquid after use. While conventional hoses require a user to physically blow out the hose with their mouth or otherwise roll up the hose and raise one end of the hose to drain the hose using gravity, the hose assembly 10 allows both hoses 12, 14 to be purged of liquid without disconnecting the hose assembly 10 from the valve assembly 16. A normally time-consuming liquid draining process can be performed in a much faster and convenient manner than conventional hoses. Similarly, the nozzle assembly 18 can remain on the hose assembly 10 during the purging process. By leaving the nozzle assembly 18 connected to the hose assembly 10, the hose assembly 10 can be stored faster and more conveniently than conventional hoses, as there is no need for any hose disassembly processes that might otherwise result in damaged or lost components. The entire purging process can occur over a short time period (e.g., 5 seconds, 10 seconds, 20 seconds, etc.) so that liquid is removed from the hose assembly 10 before a significant amount of liquid freezes within the hose assembly 10.

Figure 4:
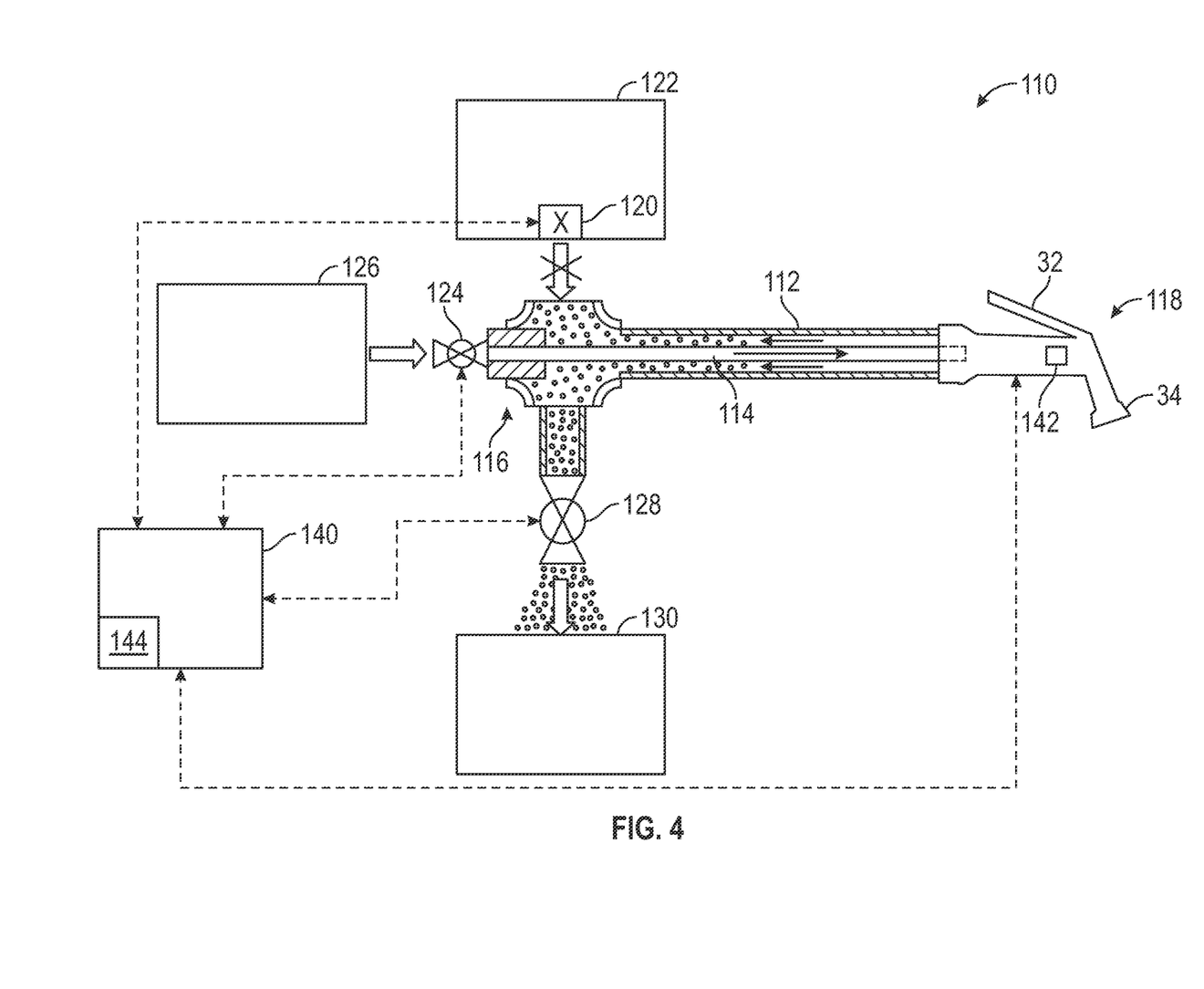
FIG. 4 is a hose assembly, according to another exemplary embodiment.

Referring now to FIG. 4, an automated hose assembly 110 is depicted. Like the hose assembly 10, the automated hose assembly 110 generally includes a water hose 112, an air hose 114, a valve assembly 116, and a nozzle assembly 118. The water hose 112 and the air hose 114 are each coupled to and extend away from a valve assembly 116 at a first end. The air hose 114 is received within and extends at least partially through the water hose 112. The nozzle assembly 118 is coupled to a second end of the water hose 112, opposite the first end. The nozzle assembly 118 directs fluid from each of the water hose 112 and the air hose 114 within the hose assembly 110.

The automated hose assembly 110 further includes a controller 140 that is in communication with one or more of the valve assembly 116 and the nozzle assembly 118 to control fluid travel through the hose assembly 110. In some examples, the controller 140 is in communication with each of a water valve 120, an air valve 124, and a drain valve 128 of the valve assembly 116. The controller 140 can provide commands that transition each of the water valve 120, the air valve 124, and the drain valve 128 between open and closed positions to perform different functions (e.g., water dispensing, purging). In some examples, the controller 140 is also in communication with the nozzle assembly 118. The controller 140 may monitor the position of the nozzle assembly (e.g., open or closed) and determine whether a purging process should be initiated based upon a detected position. In other examples, the nozzle assembly 118 may include a button 142 or other type of input that can be actuated by a user to initiate the purging process. The button 142 can communicate with the controller 140, which may then carry out the necessary processes to disconnect the water hose 112 from a pressurized water source 122, connect the air hose to a pressurized air source 126, and open a drain valve 128 so that liquid can be removed from the hose assembly 110 through a drain 130.

Figure 5:
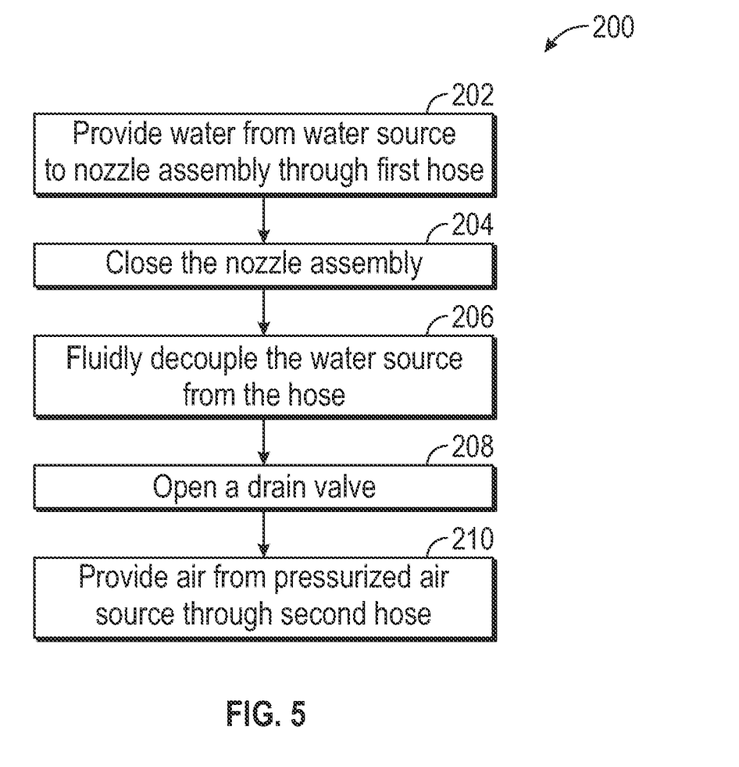
FIG. 5 is a method of purging a hose assembly that can be performed using either of the hose assemblies shown in FIGS. 1 and 4.

Referring to FIG. 5 with continued reference to FIGS. 1-4, a method of purging a hose assembly 200 is depicted. The method of purging a hose assembly 200 can be performed by either of the hose assemblies 10, 110, for example, to evacuate a water hose of liquid so that it can be stored after use in a cold weather application.

At step 202, the method 200 includes providing water from a water source (e.g., the pressurized water source 22, 122) to a nozzle assembly (e.g., the nozzle assembly 18, 118). The water is provided to the nozzle assembly 18, 118 through the water hose 12, 112 of the hose assembly 10, 110 when the water valve 20, 120 is opened. When the nozzle assembly 18, 118 is also open, water flows outward and can be used to spray water at high velocity or high pressure to perform various functions, like removing debris from the inside of a cement mixer or from one or more chutes on a cement mixer. In some examples, the controller 140 is used to carry out step 202 by opening the water valve 120 to create fluid communication between the pressurized water source 120 and the water hose 112.

At step 204, the nozzle assembly 18, 118 is closed. The nozzle assembly 18, 118 can be closed in a variety of ways, including releasing the trigger 32. In some examples, the controller 140 monitors a position of the trigger 32 or other inputs on the nozzle assembly 118 to determine whether the nozzle assembly 118 is open or closed. With the nozzle assembly 18, 118 closed, water remains within the water hose 12, 112, and is restricted from exiting outward.

At step 206, the pressurized water source 22, 122 is fluidly decoupled from the water hose 12, 112. The pressurized water source 22, 122 can be fluidly decoupled from the water hose 12, 112 by adjusting a parameter of the valve assembly 16, 116. For example, the water valve 20, 120 can be closed. In some examples, the controller 140 can be used to automatically close the water valve 120 in response to receiving an input or other determination that a purging process should begin. The controller 140 can receive information from a variety of different sensors 144 (e.g., temperature sensors, nozzle assembly position sensors) that monitor to the hose assembly 110. If the controller 140 determines that the nozzle assembly 118 has been closed for a threshold time period (e.g., 5 minutes, 10 minutes, 20 minutes, etc.) and the detected temperature is below a threshold temperature (e.g., 0 degrees Celsius, 2 degrees Celsius, etc.), the controller 140 can automatically initiate the closing of the water valve 120 and the opening of the drain valve 130 (and air valve 124) to begin a purging process. In some examples, the threshold time period adjusts based upon the detected temperature, so that the threshold time period is shorter depending on how far the detected temperature is below the threshold temperature. Accordingly, the threshold time for a detected temperature of 0 degrees C. is longer than the threshold time for a detected temperature of −10 degrees C. In other examples, the controller 140 can close the water valve 120 in response to receiving a command on button 142 of the nozzle assembly 118.

With fluid communication between the water hose 12, 112 and the pressurized water source 22, 122 blocked (e.g., the water valve 20, 120 closed), the process 200 proceeds to step 208, where the drain valve 30, 130 is opened. The drain valve 28, 128 can be manually opened by a user or automatically opened by the controller 140. With the drain valve 28, 128 opened, water within the water hose 12, 112 will naturally begin flowing rearward, away from the nozzle assembly 18, 118 and toward the drain 30, 130. Aided by gravity, water will naturally exit the hose assembly 10, 110. While a significant amount of water may naturally exit the drain 30, 130 because of the pressure differential between the water hose 12, 112 and the external environment, liquid may remain within the hose assembly 10, 110.

With the drain valve 28, 128 still in the open position, air can then be provided from the pressurized air source 126 into the air hose 14, 114 at step 210. In some examples, air is provided into the air hose 14, 114 by opening the air valve 24, 124, which can be performed manually by a user or automatically by the controller 140.

With the water valve 20, 120 closed, the air valve 24, 124 opened, the drain valve 28, 128 opened, and the nozzle assembly 18, 118 closed, the pressurized air within the hose assembly 10, 110 can blow out and purge the liquid remaining within the water hose 12, 112. As depicted in FIGS. 3 and 4, air first passes through the air hose 14, 114 toward the nozzle assembly 18, 118. With the nozzle assembly 18, 118 closed, the air exiting the air hose 14, 114 is redirected rearward, through the water hose 12, 112. The pressure and velocity of the air moving through the water hose 12, 112 pushes liquid remaining within the water hose 12, 112 rearward, toward the drain 30, 130 so that it can be removed from the hose assembly 10, 110. Depending on the pressure of the air within the air hose, the water hose 12, 112 can be purged of liquid in a short time period (e.g., 5 seconds, 10 seconds, etc.) without having to remove the nozzle assembly 18, 118 or removing the hose assembly 10, 110 from the valve assembly 16, 116. With the hose assembly 10, 110 free (or substantially free) of liquid, the hose assembly 10, 110 can be stored for future use, and damage that might otherwise be caused by water freezing within the hose assembly 10, 110 is significantly reduced or altogether avoided. The hose assembly 10, 110 does not require any disassembly to purge, significantly reducing the amount of time and effort spent by workers relative to conventional hose systems when operating within cold weather situations.

Although shown as having three separate valves in FIG. 4, the valve assembly 116 can be formed as a single solenoid-type valve. The solenoid-type valve assembly 116 has an armature that moves between a first position and a second position. In the first position, the armature defines a fluid flow path between the pressurized water source 122 and the water hose 112. The armature also blocks fluid flow between the pressurized air source 126 and the air hose 114, and also blocks the drain 130 to prevent fluid from exiting the hose assembly 110 through the valve assembly 116. In the second position, the armature blocks fluid flow between the pressurized water source 122 and the water hose 112, and permits fluid communication between the pressurized air source 126 and the air hose 114. The armature also unblocks the drain 130, so that fluid (e.g., both water and air within the hoses 112, 114) can escape the hose assembly 110 to complete the purging process. The controller 140 can control the position of the armature, which may move in response to detected conditions (e.g., water hose no longer in use) or input from a user (e.g., button 142 is pushed), for example. In some examples, the controller 140 and the valve assembly 116 are each provided with electrical power from a battery or an alternator of a vehicle that the hose assembly 110 is coupled with. In other examples, the hose assembly 110 is provided with an independent power source (e.g., a stand-alone battery).

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the hose assembly as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A hose assembly, comprising:
    a first conduit defining a first fluid path through the hose assembly;
    a second conduit received within and extending partially through the first conduit, the second conduit defining a second fluid path through the hose assembly;
    a nozzle assembly coupled to a first end of the first conduit; and
    a valve assembly fluidly coupled to the first conduit and the second conduit, the valve assembly fluidly coupled to a second end of the first conduit opposite the first end;
    wherein the valve assembly is adjustable between a first position and a second position, wherein in the first position, the valve assembly provides water into the first conduit, and wherein in the second position, the valve assembly provides pressurized air into the second conduit.

2. The hose assembly of claim 1, wherein the second fluid path is parallel to the first fluid path.

3. The hose assembly of claim 2, wherein the second conduit is concentric with the first conduit.

4. The hose assembly of claim 1, wherein the nozzle assembly is movable between an open position and a closed position, wherein in the open position, the first fluid path extends through and out of the nozzle assembly and wherein in the closed position, fluid flow from the first conduit through the nozzle assembly is restricted.

5. The hose assembly of claim 4, wherein when the nozzle assembly is in the closed position and the valve assembly is in the second position, the second fluid path extends through the second conduit, into the nozzle assembly, and into the first conduit toward the valve assembly.

6. The hose assembly of claim 4, wherein when the nozzle assembly is in the closed position and the valve assembly is in the second position, the second fluid path is partially defined by a first segment within the second conduit and a second segment within the first conduit, wherein the first segment and the second segment extend in opposite directions.

7. The hose assembly of claim 1, wherein the valve assembly is in fluid communication with a pressurized water supply, a pressurized air supply, and a drain.

8. The hose assembly of claim 7, wherein the valve assembly includes a drain valve, the drain valve providing selective fluid communication between the first conduit and the drain.

9. The hose assembly of claim 8, wherein the valve assembly includes an air valve, the air valve providing selective fluid communication between the pressurized air supply and the second conduit.

10. The hose assembly of claim 9, wherein the valve assembly includes a water valve, the water valve providing selective fluid communication between the pressurized water supply and the first conduit.

11. The hose assembly of claim 10, wherein the valve assembly is in communication with a controller, the controller being configured to move the valve assembly between the first position and the second position.

12. The hose assembly of claim 11, wherein when the valve assembly is in the first position, the water valve is open, the air valve is closed, and the drain valve is closed.

13. The hose assembly of claim 12, wherein when the valve assembly is in the second position, the water valve is closed, the air valve is open, and the drain valve is open.

14. A hose assembly, comprising:
a first hose defining a first fluid path;
a second hose received within the first hose and defining a second fluid path surrounded by the first fluid path;
a nozzle assembly coupled the first hose and the second hose; and
a valve assembly fluidly coupled to the first hose and the second hose and configured to selectively provide a first fluid into the first hose and a second fluid into the second hose;
wherein the valve assembly includes a drain valve movable between an open position and a closed position to drain each of the first hose and the second hose simultaneously.

15. The hose assembly of claim 14, wherein the valve assembly is coupled to a pressurized water supply and a pressurized air supply, the valve assembly adjustable between a first position where the first hose is in fluid communication with the pressurized water supply and a second position where the second hose is in fluid communication with the pressurized air supply, the first hose, and the drain valve.

16. The hose assembly of claim 15, wherein the valve assembly is a solenoid valve having an armature that is movable between the first position and the second position in response to receiving a signal from a controller in communication with the valve assembly.

17. The hose assembly of claim 14, wherein the nozzle assembly is movable between a dispensing position and a fluid restricting position, wherein in the fluid restricting position, the nozzle assembly redirects fluid from the second hose into the first hose.

18. The hose assembly of claim 14, further comprising a controller in communication with the valve assembly and configured to move the drain valve from the closed position to the closed position in response to receiving an indication that the first hose is disconnected from a pressurized water source.

19. A method of purging a hose assembly, comprising:
providing water from a water source through a first hose to a nozzle assembly coupled to the first hose;
closing the nozzle assembly;
fluidly decoupling the water source from the first hose;
opening a drain valve independent of the water source; and
providing air from a pressurized air source through a second hose received within the first hose,
wherein the air is directed through the second hose, into the nozzle assembly, and rearward into the first hose to push water within the first hose outward toward the drain valve.

20. The method of claim 19, wherein the step of fluidly decoupling the water source from the first hose includes closing a water valve positioned between the first hose and the water source.

* * * * *